Dec. 25, 1956   H. E. GETTEL   2,775,498
VARIABLE TRAY BOX
Filed Dec. 3, 1953
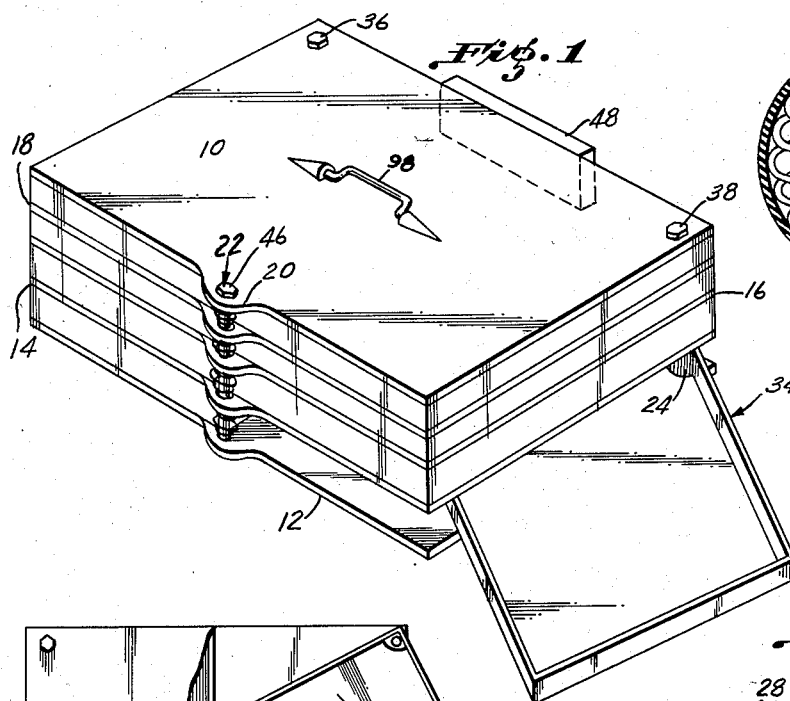
Fig. 1
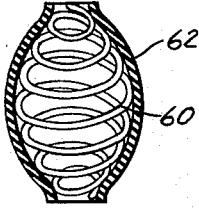
Fig. 5
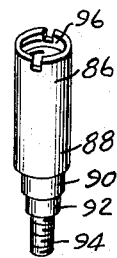
Fig. 6
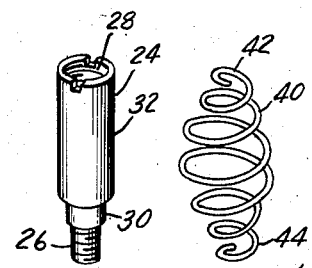
Fig. 3
Fig. 2
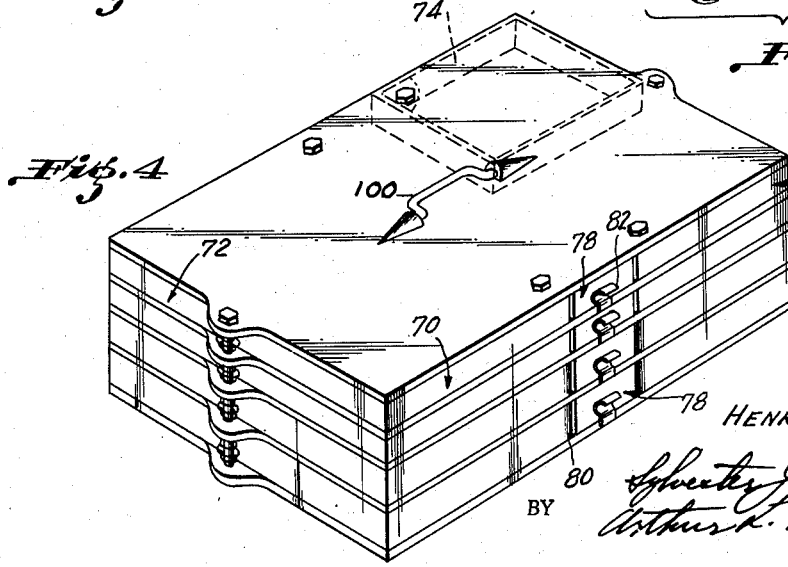
Fig. 4
INVENTOR
HENRY E. GETTEL
BY
ATTORNEY

United States Patent Office 2,775,498
Patented Dec. 25, 1956

2,775,498

VARIABLE TRAY BOX

Henry E. Gettel, Dallas, Tex.

Application December 3, 1953, Serial No. 395,913

4 Claims. (Cl. 312—201)

This invention relates to boxes or containers having trays, and in particular to a variable tray box in which trays can be added or deleted to accommodate the box to different purposes.

Tray boxes are used for mony purposes, such as for storing fishing tackle, cards, screws, tools, etc. Many boxes are intended to remain stationary while others are portable. Particularly in the latter type of box, but also in the former, the design, size and weight of the box are important. The simpler and less cumbersome a tray box is, the easier it is to carry. It is, therefore, an object of this invention to provide a tray box of extremely simple construction in which all unnecessary elements are eliminated and in which the size and weight are kept to a minimum.

It is impossible to obtain a tray box of fixed capacity and dimensions which is suitable for all purposes, or even suitable for any given purpose where the need for increasing or decreasing the storage space might arise. This is particularly apparent to those who use portable tray boxes such as fishermen, mechanics, etc. If a tackle box of the usual construction, for example, is purchased, its size is fixed. Such a box cannot be varied in accordance with the varying needs of the fisherman. When a fisherman goes on one expedition he may need more or less tackle than on his previous expedition, nonetheless with the usual form of box he cannot vary his storage capacity or the weight or size of the box itself. It is accordingly another object of my invention to provide a tray box which is variable in size and storage capacity.

Other faults common with boxes such as the usual fishing tackle box or tool box, are that the trays are not readily accessible—some trays must be removed to get at a desired tray, that all the tackle or tools are not visible, and that the trays do not remain attached to the box proper. Often where loose trays are provided the contents thereof will be spilled. Therefore, yet another object of my invention is to provide a tray box in which all the trays are readily accessible, in which trays remain attached to the box at all times in a stable manner, and in which the trays are each individually accessible.

These and other objects and advantages will become apparent from the following description and the accompanying drawings, in which:

Figure 1 is a perspective view of a tray box constructed in accordance with my invention.

Figure 2 is a top plan view with some portions broken away.

Figure 3 is a perspective view of a retaining means and spacer element.

Figure 4 is a perspective view of a modified form of my invention.

Figure 5 is a perspective view of another form of retaining means.

Similar reference characters in the several views represent similar elements.

Referring now particularly to the drawing, the tray box constructed in accordance with my invention comprises a top plate 10, a bottom plate 12, and spaced intermediate plates 14, 16 and 18. Each of these plates can be formed of a flat sheet of transparent material, such as a plastic, and each is provided along one side with a flange 20. The plates are assembled with the flanges 20 in vertically spaced relationship.

One side of the plates are interconnected in spaced relationship by means of the flanges 20. A supporting column 22 is used for this purpose. The column is made up of a series of individual spacer elements 24 shown in Figure 3. Each of the spacer elements has a depending threaded stud 26, a threaded stud-receiving opening 28, a reduced section 30 and a cylindrical body 32.

The plate and trays 34 are interconnected at two spaced points remote from flanges 20 by columns 36 and 38 formed of spacer elements 24. In the preferred form the latter columns are at the opposite or rear side with respect to flanges 20. Also the rear columns are positioned adjacent the lateral sides or ends of the plate whereas column 22 is positioned centrally of the front side.

The columns are formed by assembling a number of elements 24, one element being provided intermediate each pair of plates. Reduced portion 30 extends into the plate and the studs 26 are screwed into the stud-receiving openings 28.

A bolt 46 is used to connect to the top plate, and a nut is used below the bottom plate. The main body portion 32 serves to space the plates. The springs of column 22 are placed on each member 24 as it is assembled. The trays 34 pivot on body 32 of the rear columns.

A resilient deformable spring 40 is adapted to be positioned on each of the spacers 24 of column 22. The end turns 42 and 44 closely grip body 32 whereas the central turns are spaced therefrom. The spring is formed of the usual spring wire and can be deformed, that is, the central turns can be pushed laterally toward the body 38 at any one point.

As seen in Figures 1 and 2, the spring 40 on column 22 normally abuts the inner front edge of the trays 34. Also it is seen from the drawings that the trays when received within the plates, abut each other in such a manner that they cannot pivot rearwardly. The trays can only pivot outwardly in the manner illustrated in Fig. 2. The deformable member 40 serves to maintain the trays in closed position. When it is desired to move a tray outwardly, the tray is pushed at its rear side with sufficient force to deform the spring. When the spring is deformed the tray will move as indicated.

A stop comprising depending flange 48 connected to each of the plates can be provided at the rear thereof if desired.

In Figure 5 I show a modified form of resilient restraining means and comprising a spring 60 constructed similarly to spring 40 and a deformable rubber or plastic encasement element 62. The retaining means of Fig. 5 can be deformed similarly to that of Fig. 3.

In Fig. 4 I show another form of my invention. In this form four groups of pivotal trays 70, 72, 74 and 76 are provided. Central sliding trays 78 are also shown. The upper sliding trays 78 are shown to cooperate with square edged pivoting trays. With such construction it is necessary to slide trays 78 to one side in order to pivot a tray 70 outwardly. However, the lower trays 70 are shown to have rounded corners 80. These trays can be pivoted outwardly without moving the sliding trays 78. Trays 78 are resiliently retained in their normal position by means of spring clip elements 82 positioned at each side of the plates.

The rear columns 36 and 38 can be formed by spacer elements 86 shown in Fig. 6. These spacer elements are shown to consist of a main body portion 88, a reduced intermediate portion 90, a further reduced lower portion 92 and a threaded stud 94. The upper end of the member has a threaded stud-receiving opening 96. The reduced portion 90 cooperates with a suitable opening provided in the trays and reduced portion 92 with an opening provided in the plates.

Handles 98, 100 can be provided centrally of the top plates for convenient carrying. It is obvious that straps or other devices may be used. The handles can be formed of a resilient material and snapped into position in the bosses provided on the top plate.

From the foregoing description it is apparent that I have devised a tray box in which the gear carried in all trays is readily accessible. All of the trays can be individually pivoted outwardly to expose their contents. Furthermore, this is accomplished without detaching the trays from the box. The simplicity of construction is also an advantage since it reduces the size and weight. The unique spring latch arrangement further contributes to simplicity and reduction in the cost of a tray box. Special morticing, etc. for conventional latches is unnecessary.

Another important feature of my invention lies in the fact that the tray box can be accommodated to varying purposes. The number of trays can be reduced or increased in a simple manner. To reduce the number of trays it is only necessary to remove the upper studs, remove the upper plate and then remove a sufficient number of trays and intermediate plates and spacer elements. Likewise the size can be increased by removing the upper plate, adding other intermediate plates, more trays, spacer elements and springs.

While I have shown and described a preferred form of my invention, it will be understood that variations in details of form may be made without departure from the invention as defined in the appended claims.

I claim:

1. A tray box comprising a top plate, a bottom plate, means for connecting said plates and maintaining them is spaced relationship, a pair of trays, each pivotally connected to one of said means and normally positioned in abutting relationship to each other, said trays being normally received between said plates and being pivotal out of abutting relationship to a position in which the contents thereof are exposed, means for releasably retaining said trays in said normal position comprising a resilient distortable member connected to said plates and normally bearing against both of said trays to retain them in normal position, said member being distortable by urging one of said trays thereagainst to pivot the latter tray outwardly of said plates and said member retaining the other of said trays in said normal position during distortion thereof.

2. A tray box comprising a top plate and a bottom plate, means for connecting said plates and maintaining them in spaced relationship, comprising spacer elements positioned in interconnecting relationship at one side of said plates, and an additional spacer element connected to said plates at an opposite side thereof, trays pivotally connected to the first mentioned spacer elements and normally positioned between said plates, a resilient catch connected to the additional spacer element and normally engaging both of said trays to maintain them in normal position, said catch being displaceable upon pivotal movement of one of said trays outwardly of said plates, and said catch retaining the other of said trays in said normal position during distortion thereof.

3. A tray box comprising a top plate, a bottom plate, means for connecting said plates and maintaining them in spaced relationship comprising spacer elements, two of said elements being connected to said plates adjacent one side thereof, a third of said elements being connected adjacent the other side of said plates and lying intermediate said two of said elements, a tray pivotally connected to each of said two of said elements, and each tray lying normally intermediate said plates and pivotal out of position intermediate said plates, each of said trays having a side normally abutting a side of the other of said trays and an edge normally lying adjacent said third element, a resilient member surrounding said third element and having a portion normally contacting the edge of both of said trays and retaining said trays in a normal position, said resilient member being deformable for movement of one of said trays out from position intermediate said plates and said resilient member retaining the other of said trays in said normal position during deformation for movement of said one of said trays.

4. A tray box comprising a top plate, a bottom plate, means for connecting said plates and maintaining them in spaced relationship comprising spacer elements, two of said elements being connected to said plates adjacent one side thereof, a third of said elements being connected adjacent the other side of said plates and lying intermediate said two of said elements, a tray pivotally connected to each of said two of said elements, and each tray lying normally intermediate said plates and pivotal out of position intermediate said plates, each of said trays having a side normally abutting a side of the other of said trays, and an edge normally lying adjacent the said third element, and resilient means contacting said edge of each of said trays, the resilient means contacting each of said edges contacting said third element and said trays being normally retained in said normal abutting relationship by the resilient means, said resilient means contacting each of said trays being deformable for movement of one of said trays out from position intermediate said plates with the resilient means contacting the other of said trays retaining said other of said trays in normal position during movement of said one of said trays.

References Cited in the file of this patent

UNITED STATES PATENTS

| | | |
|---|---|---|
| 509,773 | Simmons | Nov. 28, 1893 |
| 977,137 | Sexton | Nov. 29, 1910 |
| 982,767 | Dunham | Jan. 24, 1911 |
| 1,677,043 | Morrill | July 10, 1928 |
| 1,785,666 | Bachelder | Dec. 16, 1930 |
| 2,499,818 | Dedricks | Mar. 7, 1950 |

FOREIGN PATENTS

| | | |
|---|---|---|
| 525,985 | Germany | Feb. 13, 1930 |
| 874,904 | France | Aug. 31, 1942 |